(12) United States Patent
Hayashi et al.

(10) Patent No.: US 11,551,375 B2
(45) Date of Patent: Jan. 10, 2023

(54) CONTROLLER, POSITION DETERMINATION DEVICE, POSITION DETERMINATION SYSTEM, AND DISPLAY SYSTEM FOR DETERMINING A POSITION OF AN OBJECT POINT IN A REAL SPACE BASED ON CORNEA IMAGES OF A FIRST EYE AND A SECOND EYE OF A USER IN CAPTURED IMAGE

(71) Applicant: KYOCERA Corporation, Kyoto (JP)

(72) Inventors: Yusuke Hayashi, Kunitachi (JP); Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/290,980

(22) PCT Filed: Oct. 28, 2019

(86) PCT No.: PCT/JP2019/042204
§ 371 (c)(1),
(2) Date: May 3, 2021

(87) PCT Pub. No.: WO2020/095747
PCT Pub. Date: May 14, 2020

(65) Prior Publication Data
US 2022/0036582 A1    Feb. 3, 2022

(30) Foreign Application Priority Data
Nov. 5, 2018    (JP) .............................. JP2018-208358

(51) Int. Cl.
*G02B 27/01*    (2006.01)
*G06T 7/73*    (2017.01)
(Continued)

(52) U.S. Cl.
CPC ............ *G06T 7/73* (2017.01); *G02B 27/0172* (2013.01); *G02B 27/0179* (2013.01);
(Continued)

(58) Field of Classification Search
CPC ...... G02B 2027/0138; G02B 2027/014; G02B 2027/0187; G02B 27/0172;
(Continued)

(56) References Cited

U.S. PATENT DOCUMENTS

| 9,268,024 B1 * | 2/2016 | Starner ................ G06V 40/197 |
| 2013/0002846 A1 * | 1/2013 | De Bruijn ............ G06V 40/193 |
| | | 348/78 |
| 2017/0156590 A1 | 6/2017 | Kawauchi et al. |

(Continued)

FOREIGN PATENT DOCUMENTS

| JP | 2006-309291 A | 11/2006 |
| JP | 2016-122380 A | 7/2016 |

(Continued)

OTHER PUBLICATIONS

W. W. Abbott et al., "Ultra-low-cost 3D gaze estimation: an intuitive high information throughput compliment to direct brain-machine interfaces," Journal of Neural Engineering, 9(4):046016, Jul. 12, 2012, pp. 1-11, IOP Publishing.

(Continued)

*Primary Examiner* — Ram A Mistry
(74) *Attorney, Agent, or Firm* — Studebaker & Brackett PC

(57) ABSTRACT

A controller is configured to determine a position of an object point in a real space, based on a cornea image of a first eye and a cornea image of a second eye of a user who is viewing the object point, in a captured image generated by imaging the first and second eyes of the user by an imaging device.

6 Claims, 11 Drawing Sheets

(51) Int. Cl.
   *G06F 3/01*    (2006.01)
   *G06T 7/60*    (2017.01)
(52) U.S. Cl.
   CPC ............... *G06F 3/013* (2013.01); *G06T 7/60* (2013.01); *G02B 2027/014* (2013.01); *G02B 2027/0138* (2013.01); *G02B 2027/0187* (2013.01)
(58) Field of Classification Search
   CPC ............... G02B 27/0179; G06F 3/013; G06T 2207/30041; G06T 2207/30201; G06T 7/593; G06T 7/60; G06T 7/73
   See application file for complete search history.

(56) References Cited

U.S. PATENT DOCUMENTS

| | | | |
|---|---|---|---|
| 2017/0169578 A1* | 6/2017 | Nakazawa | ............. H04N 7/181 |
| 2018/0165528 A1 | 6/2018 | Koishi et al. | |

FOREIGN PATENT DOCUMENTS

| | | |
|---|---|---|
| WO | 2016031666 A1 | 3/2016 |
| WO | 2016208200 A1 | 12/2016 |
| WO | 2018000020 A1 | 1/2018 |

OTHER PUBLICATIONS

S. Mujahidin et al., "3D gaze tracking in real world environment using orthographic projection," AIP Conference Proceedings, 1746(1):020072, Jun. 17, 2016, pp. 1-6, AIP Publishing.

\* cited by examiner

FIG. 3A
RIGHT-EYE IMAGE
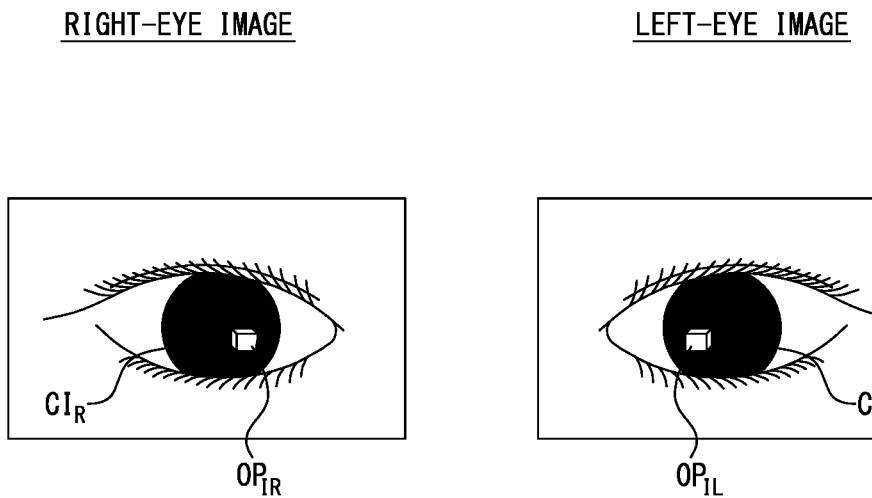
FIG. 3B
LEFT-EYE IMAGE
FIG. 4
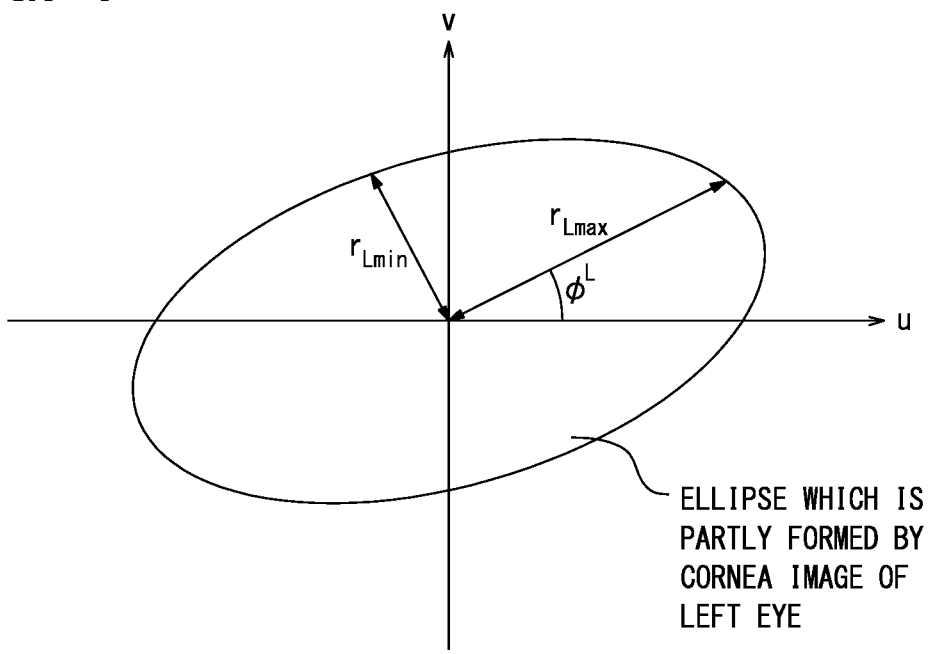
ELLIPSE WHICH IS PARTLY FORMED BY CORNEA IMAGE OF LEFT EYE CONTROLLER, POSITION
DETERMINATION DEVICE, POSITION
DETERMINATION SYSTEM, AND DISPLAY
SYSTEM FOR DETERMINING A POSITION
OF AN OBJECT POINT IN A REAL SPACE
BASED ON CORNEA IMAGES OF A FIRST
EYE AND A SECOND EYE OF A USER IN
CAPTURED IMAGE

CROSS-REFERENCE TO RELATED APPLICATION

This application claims priority to Japanese Patent Application No. 2018-208358, which was filed on Nov. 5, 2018, the contents of which are incorporated herein by reference in its entirety.

TECHNICAL FIELD

The present disclosure relates to a controller, a position determination device, a position determination system, a display system, a program, and a recording medium.

BACKGROUND ART

In a related art, it is known to calculate the distance to a subject such as an object or a person, based on captured images respectively captured by two cameras of a stereo camera. For example, Patent Literature 1 describes calibrating relative deviation between positions and orientations of the two cameras in order to accurately calculate the distance in such a stereo camera.

CITATION LIST

Patent Literature

Patent Literature 1: WO 2016/208200 A1

SUMMARY OF INVENTION

A controller of the disclosure is configured to determine a position of an object point in a real space, based on a cornea image of a first eye and a cornea image of a second eye of a user who is viewing the object point, in a captured image generated by imaging the first and second eyes of the user by an imaging device.

A position determination device of the disclosure includes a communication module and a controller. The communication module is configured to receive a captured image generated by imaging first and second eyes of a user who is viewing an object point, by an imaging device. The controller is configured to determine a position of the object point in a real space, based on a cornea image of the first eye and a cornea image of the second eye in the captured image.

A position determination system of the disclosure includes an imaging device and a position determination device. The position determination device includes a communication module and a controller. The communication module is configured to receive a captured image generated by imaging first and second eyes of a user who is viewing an object point, by the imaging device. The controller is configured to determine a position of the object point in a real space, based on a cornea image of the first eye and a cornea image of the second eye in the captured image.

A display system of the disclosure includes an imaging device, a position determination device, and a head-up display. The position determination device includes a communication module and a controller. The communication module is configured to receive a captured image generated by imaging first and second eyes of a user who is viewing an object point, by the imaging device. The controller is configured to determine a position of the object point in a real space, based on a cornea image of the first eye and a cornea image of the second eye in the captured image. The head-up display is configured to, based on the position of the object point determined by the controller, display a virtual image that the eyes of the user view at a position related to the position of the object point.

A program of the disclosure causes a controller to determine a position of an object point in a real space, based on a cornea image of a first eye and a cornea image of a second eye of a user who is viewing the object point, in a captured image generated by imaging the first and second eyes of the user by an imaging device.

A recording medium of the disclosure is a computer-readable recording medium recording a program. The program is a program for causing a controller to determine a position of an object point in a real space, based on a cornea image of a first eye and a cornea image of a second eye of a user who is viewing the object point, in a captured image generated by imaging the first and second eyes of the user by an imaging device.

BRIEF DESCRIPTION OF DRAWINGS

FIGS. 3A and 3B are diagrams illustrating an example of eye images extracted from the captured image illustrated in FIG. 1, FIG. 3A is a diagram illustrating an example of a right-eye image, and FIG. 3B is a diagram illustrating an example of a left-eye image;

FIG. 4 is a diagram schematically illustrating an example in which an ellipse which is partly formed by a cornea image of a left eye illustrated in FIG. 3B is tilted;

DESCRIPTION OF EMBODIMENTS

When two imaging devices are used to measure a distance, the cost is higher than when only one imaging device is used. In order to solve this problem, it has been desired to calculate the distance to a subject in a real space by using one imaging device.

The disclosure provides a controller capable of accurately determining the position of a subject in a real space by using one imaging device, a position determination device, a position determination system, a display system, a program, and a recording medium.

Hereinafter, embodiments of the disclosure will be described with reference to drawings. The figures used in the following description are schematic, and the dimensional ratios and the like on the drawings do not always match actual ones.

Figure 1:
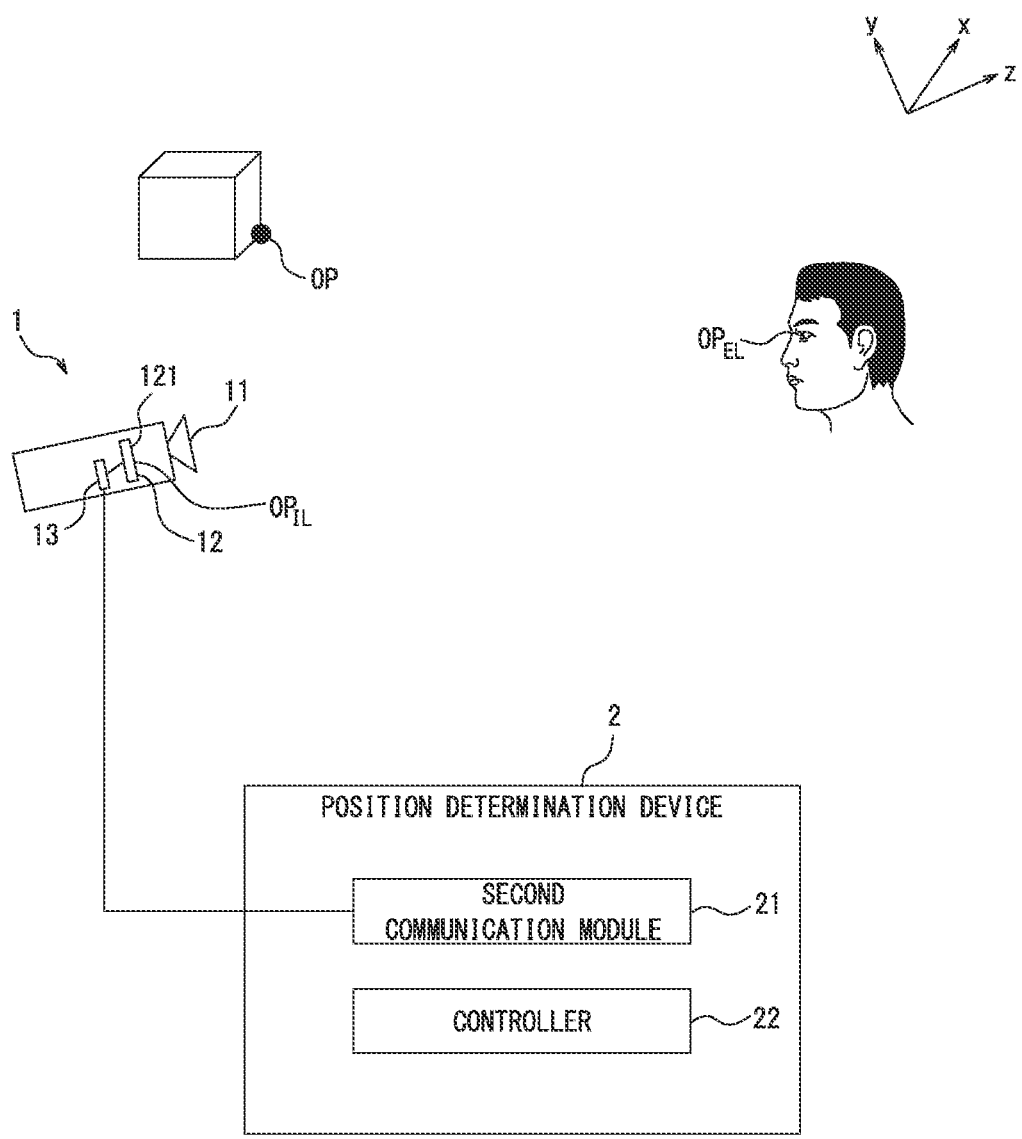
FIG. 1 is a diagram illustrating a schematic configuration of a position determination system according to a first embodiment.

As illustrated in FIG. 1, a position determination system 100 according to a first embodiment of the disclosure includes an imaging device 1 and a position determination device 2.

The imaging device 1 is placed so that both eyes of a user are included in an imaging range. In the following description, an optical axis direction of the imaging device 1 is represented as a z-axis direction. An inter-eye direction along a direction connecting a left eye (first eye) and a right eye (second eye) when the user is facing the imaging device 1 is represented as an x-axis direction. A direction orthogonal to the optical axis direction and the inter-eye direction is represented as a y-axis direction.

The imaging device 1 includes an imaging optical system 11, an imaging element 12, and a first communication module 13.

The imaging optical system 11 is configured to include one or more lenses. The imaging optical system 11 is placed so that the optical axis of the imaging optical system 11 is perpendicular to an imaging plane 121 of the imaging element 12. The imaging optical system 11 is configured to form an image of light incident from the subject on the imaging plane 121 of the imaging element 12 as a subject image.

The imaging element 12 may include, for example, a CCD (Charge Coupled Device) imaging element or a CMOS (Complementary Metal Oxide Semiconductor) imaging element. The imaging device 12 is configured to generate a captured image by converting an image formed on the imaging plane 121 by the imaging optical system 11.

The first communication module 13 can communicate with the position determination device 2. Specifically, the first communication module 13 is configured to transmit the captured image generated by the imaging element 12, to the position determination device 2. The communication method used in the communication between the first communication module 13 and the position determination device 2 may be a short-range or long-range wireless communication standard, or may be a wired communication standard. The short-range wireless communication standard may include, for example, Wi-Fi (registered trademark), Bluetooth (registered trademark), infrared rays, NFC (Near Field Communication), and the like. The long-range wireless communication standard may include, for example, LTE (Long Term Evolution), fourth-generation mobile communication systems, fifth-generation mobile communication systems, and the like.

The position determination device 2 includes a second communication module (communication module) 21 and a controller 22.

The second communication module 21 can communicate with the first communication module 13 of the imaging device 1. The communication method used in communication with the first communication module 13 by the second communication module 21 may be the same as the communication method used in the first communication module 13. The second communication module 21 is configured to receive a captured image from the first communication module 13.

The controller 22 is connected to each component of the position determination device 2 and can control each component. The components controlled by the controller 22 include the second communication module 21. The controller 22 is configured as, for example, a processor. The controller 22 may include one or more processors. The processor may include a general-purpose processor that loads a specific program and executes a specific function, and a dedicated processor specialized for a specific type of processing. The dedicated processor may include an application specific integrated circuit (ASIC). The processor may include a programmable logic device (PLD). The PLD may include an FPGA (Field-Programmable Gate Array). The controller 22 may be either a SoC (System-on-a-Chip) or a SiP (System In a Package) in which one or more processors cooperate.

Figure 2:
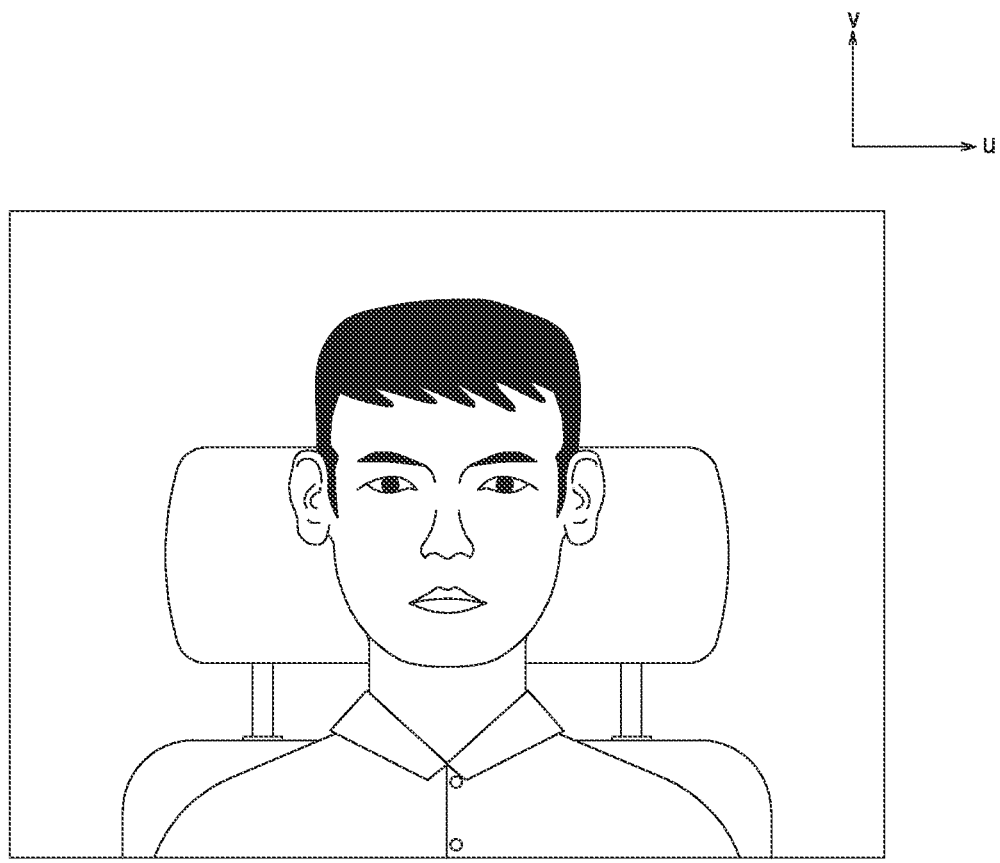
FIG. 2 is a diagram illustrating an example of a captured image generated by an imaging device illustrated in FIG. 1.

The controller 22 is configured to control the imaging device 1 to generate an image captured by imaging both eyes of the user as illustrated in FIG. 2. The controller 22 is configured to acquire the captured image generated by the imaging device 1 and received by the second communication module 21. The controller 22 is configured to carry out various kinds of processing based on the captured image.

As illustrated in FIG. 1, when the eyes of the user is viewing an object point OP, the object point OP is projected onto the cornea of the left eye, and an image $OP_{IL}$ of an image $OP_{EL}$ of the object point projected onto the cornea of the left eye is formed on the imaging plane 121 of the imaging device 1.

When the eyes of the user are in a reference state of looking in the direction of the imaging device 1, a cornea image CI on the captured image is substantially circular. On the other hand, when the eyes of the user are facing a direction different from that of the imaging device 1, the cornea image CI on the captured image forms a part of an ellipse as illustrated in FIGS. 3A and 3B. The position of an image $OP_{IR}$ of an object point in a cornea image $CI_R$ of the right eye illustrated in FIG. 3A is different from the position of the image $OP_{IL}$ of an object point in a cornea image $CI_L$ of the left eye illustrated in FIG. 3B. That is, the image $OP_{IR}$ of the object point and the image $OP_{IL}$ of the object point have parallax with each other.

As illustrated in FIG. 4, which schematically represents the ellipse which is partly formed by the cornea of the left eye illustrated in FIGS. 3A and 3B, a major axis $r_{Lmax}$ of the ellipse extends in a direction inclined with respect to the inter-eye direction of the image. The inter-eye direction of the image is the direction along the direction connecting the center of the left-eye image and the center of the right-eye image when the eyes are in the reference state in the captured image.

Figure 5:
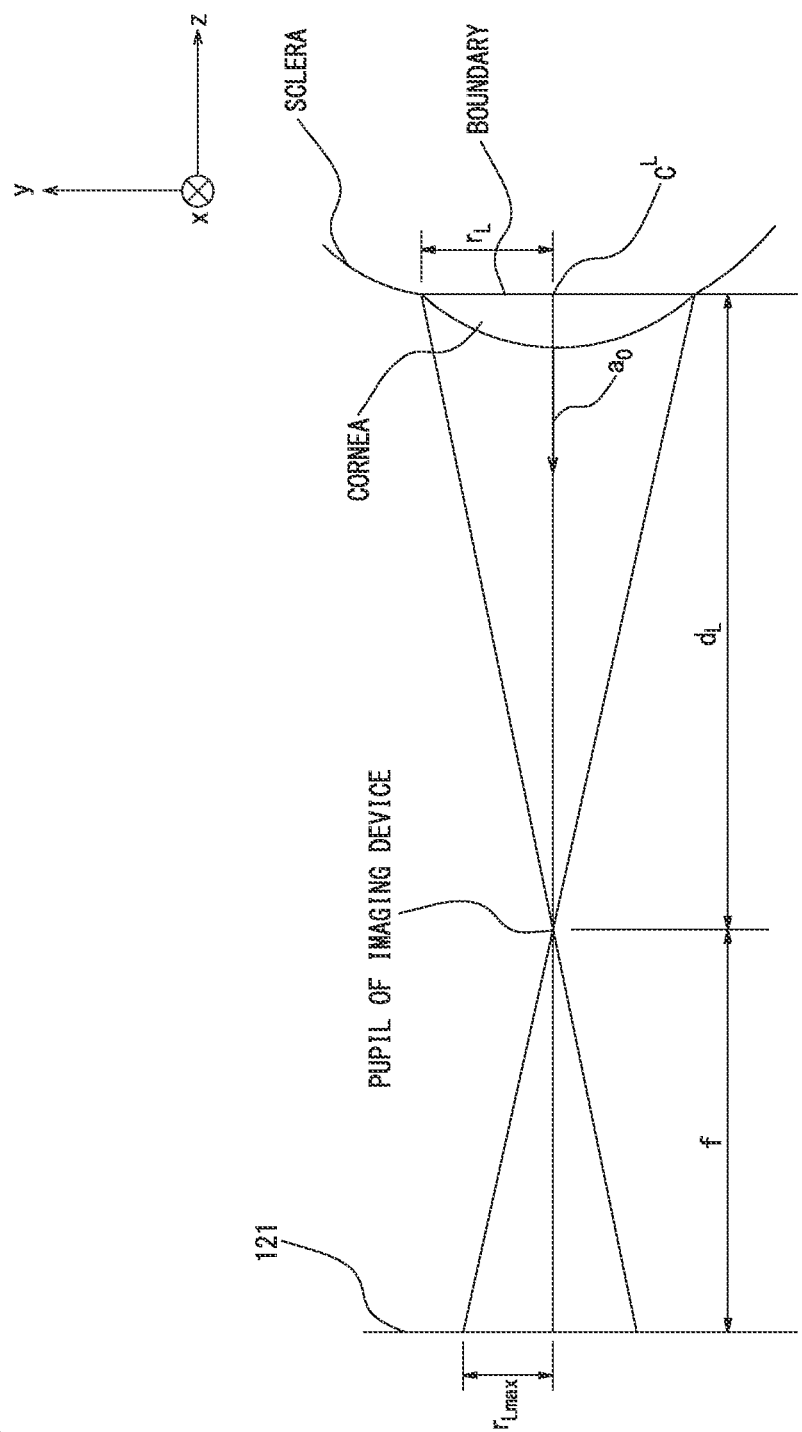
FIG. 5 is a schematic diagram illustrating a relationship between a cornea and an image plane when an eye is in a reference state.

The controller 22 is configured to determine the feature amounts of the cornea image $CI_L$ of the left eye in the captured image. The feature amounts are the lengths of the major axis $r_{Lmax}$ and a minor axis $r_{Lmin}$ of the ellipse which is partly formed by the cornea image $CI_L$ of the left eye, and the direction in which the major axis $r_{Lmax}$ extends. The controller 22 is configured to calculate a left cornea center position (first cornea center position) $C^L$ and the cornea direction of the left eye (first cornea direction) in the real space, based on the feature amounts. The left cornea center position $C^L$ is the center of the boundary between the cornea and sclera of the left eye as illustrated in FIG. 5. The cornea direction of the left eye is the normal direction of the tangent plane at the center of the cornea of the left eye. The cornea direction when the eye is in the reference state is called a left-eye reference direction $a_0$.

Similarly, the controller 22 is configured to determine the feature amounts of the cornea image $CI_R$ of the right eye in the captured image. The feature amounts are the lengths of a major axis $r_{Rmax}$ and a minor axis $r_{Rmin}$ of the ellipse which is partly formed by the cornea image $CI_R$ of the right eye, and the direction in which the major axis $r_{Rmax}$ extends. The controller 22 is configured to calculate a right cornea center position (second cornea center position) $C^R$ and the cornea direction of the right eye (second cornea direction) in the real space, based on the feature amounts. The right cornea center position $C^R$ is the center of the boundary between the cornea and sclera of the right eye. The cornea direction of the right eye is the normal direction of the tangent plane at the center of the cornea of the right eye.

Hereinafter, the processing in which the controller 22 determines the feature amounts of the cornea images $CI_L$ and $CI_R$ of the left eye and the right eye will be described in detail. The processing in which the controller 22 calculates the left cornea center position $C^L$ and the right cornea center position $C^R$ in the real space, and the directions of the corneas of the left and right eyes will be described in detail.

<Determination of Feature Amounts of Cornea Images>

The controller 22 extracts the cornea image $CI_L$ of the left eye in the captured image. For example, the controller 22 extracts the entire image of the eyes in the captured image by using pattern matching or the like. The controller 22 may extract an area of the eye image that forms a part of the ellipse having a brightness value equal to or less than a predetermined value as the cornea image $CI_L$ of the left eye. The predetermined value is a value related to the upper limit value of the brightness value that can be taken by the image of the human eye. The predetermined value can be set by the upper limit value of the brightness value of the human eye, the brightness of the surrounding environment, and the like. When the maximum value to the minimum value of the brightness value is represented by 256 gradations, the predetermined value may be, for example, 10. The controller 22 may extract the cornea image $CI_L$ of the left eye in the captured image by Hough transform. The Hough transform transforms points on Cartesian coordinates into elliptical parameters. The controller 22 may divide the ellipse into a plurality of clusters and extract the cornea image $CI_L$ of the left eye in the captured image for each cluster. For example, the ellipse may be divided into four clusters. If the plurality of clusters have different ellipses, the clusters merge into one ellipse.

The controller 22 determines the major axis $r_{Lmax}$ and minor axis $r_{Lmin}$ of the ellipse which is partly formed by the cornea image $CI_L$ of the left eye, as illustrated in FIG. 4. The controller 22 determines an angle $\phi^L$ formed by the direction of the major axis $r_{Lmax}$ and the inter-eye direction.

The controller 22 also determines the major axis $r_{Rmax}$ and minor axis $r_{Rmin}$ of the ellipse which is partly formed by the cornea image $CI_R$ of the right eye. The controller 22 determines an angle $\phi^R$ formed by the direction of the major axis $r_{Rmax}$ and the inter-eye direction.

<Calculation of Center Positions of Corneas>

As illustrated in FIG. 5, the controller 22 calculates a distance $d_L$ from the pupil of the imaging device 1 to the left cornea center position $C^L$, based on a focal length f of the imaging device 1, and the major axis $r_{Lmax}$ of the ellipse which is partly formed by the cornea image $CI_L$ of the left eye and the cornea radius $r_L$ of the left eye. The focal length f is a known value defined by the specifications of the imaging device 1. A cornea radius $r_L$ is a value based on the radius of the general cornea of a human and is about 5.6 mm. Specifically, the controller 22 calculates the distance $d_L$ using Expression (1).

$$d_L = r_L \times \frac{f}{r_{Lmax}} \tag{1}$$

When the distance $d_L$ is calculated, the controller 22 calculates the left cornea center position $C^L$ in the real space, based on the calculated distance $d_L$, the known position of the imaging plane 121 of the imaging device 1, and the focal length f.

The controller 22 also calculates the right cornea center position $C^R$.

<Calculation of Directions of Corneas>

Figure 6:
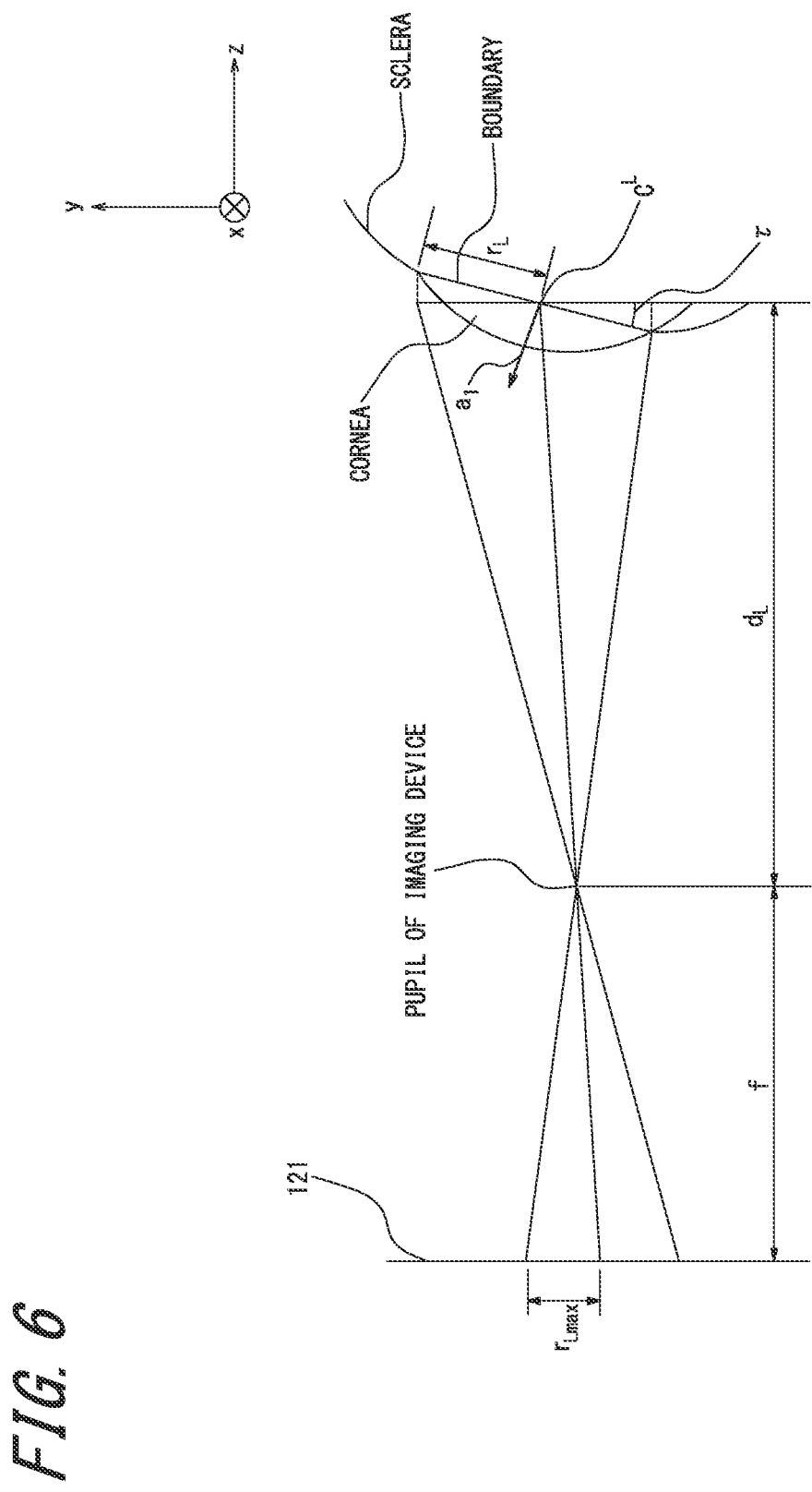
FIG. 6 is a schematic diagram illustrating a relationship between the cornea and the image plane when the eye is not in the reference state.

The controller 22 calculates a cornea direction $a_1$ as illustrated in FIG. 6, based on the major axis $r_{Lmax}$ and the minor axis $r_{Lmin}$ of the left-eye image. The cornea direction $a_1$ is the normal direction of the tangent plane at the center of the cornea.

The controller 22 calculates the angle $\tau_L$ of rotation around the axis in the inter-eye direction (x-axis direction) from the left-eye reference direction $a_0$ in the cornea direction $a_1$ of the left eye, using Expression (2). As described above, the left-eye reference direction $a_0$ is the cornea direction of the left eye when the left eye is facing the imaging device 1.

$$\tau^L = \cos^{-1}\left(\frac{r_{Lmin}}{r_{Lmax}}\right) \tag{2}$$

The controller 22 determines the direction indicated by ($\tau^L$, $\phi^L$) with an angle $\tau L$ and the angle $\phi^L$ as parameters as the cornea direction $a_1$ of the left eye.

The controller 22 also determines the cornea direction ($\tau^R$, $\phi^R$) of the right eye, based on the major axis $r_{Rmax}$ and minor axis $r_{Rmin}$ of the right-eye image.

<Calculation of Position of Object Point>

The controller 22 calculates the position of the object point OP in the real space, based on the left cornea center position $C^L$ and the right cornea center position $C^R$.

First Example

Figure 7:
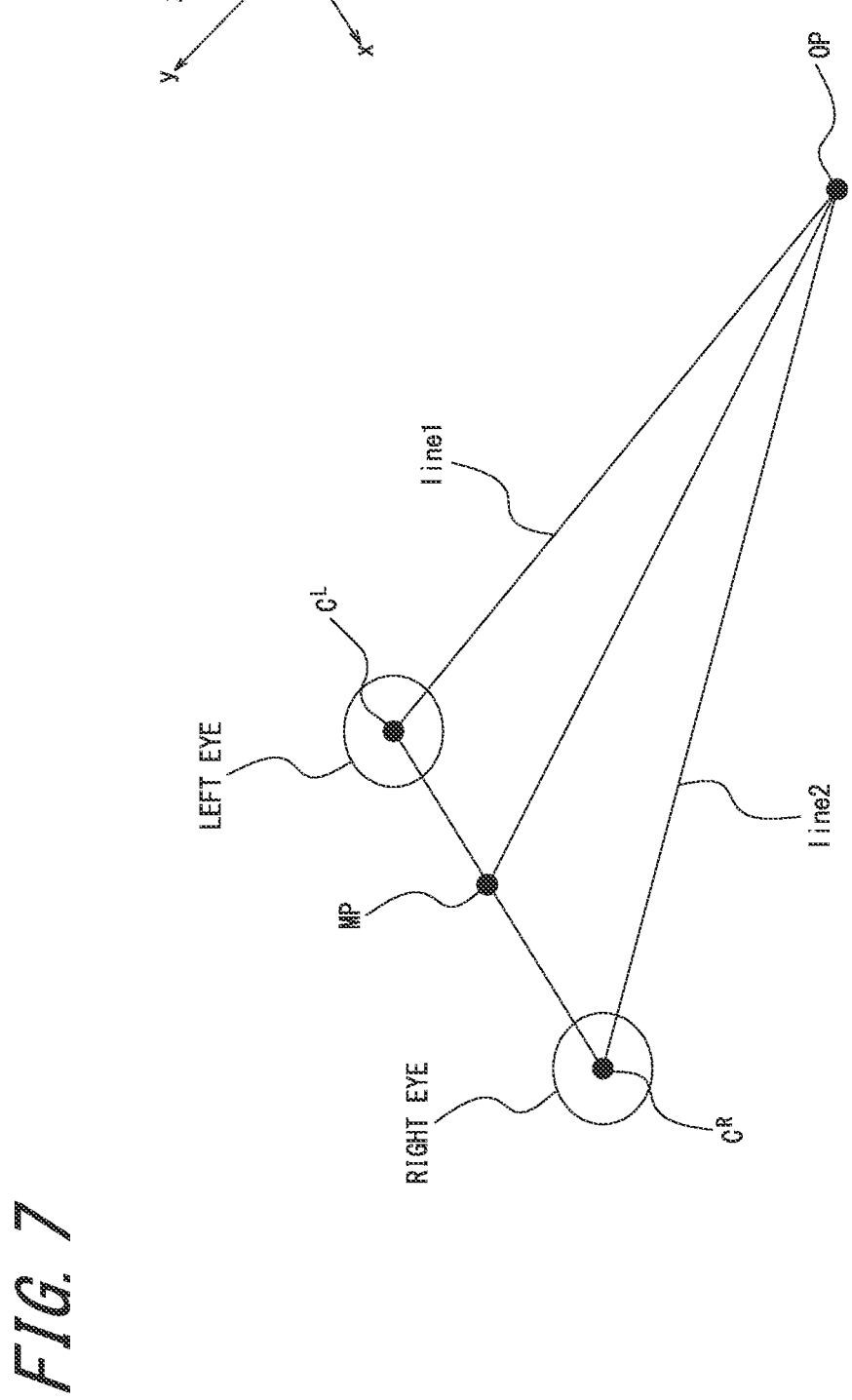
FIG. 7 is a diagram illustrating a relationship between a left center position, a left normal direction, a right center position, a right normal direction, and a position of an object point.

As illustrated in FIG. 7, the controller 22 calculates an expression representing a first straight line line1 from the left cornea center position $C^L$ toward the cornea angle ($\tau^L$, $\phi^L$) of the left eye in the real space. Similarly, the controller 22 calculates an expression representing a second straight line line2 from the right cornea center position $C^R$ toward the cornea angle ($\tau^R$, $\phi^R$) of the right eye. The controller 22 calculates the intersection of the first straight line line1 and the second straight line line2 as the position of the object point OP. When calculating the position of the object point OP, the controller 22 may calculate the distance from the midpoint of the left eye and the right eye to the object point OP.

Second Example

The controller 22 calculates the position of the object point OP in the real space, based on the position of the image $OP_{IL}$ of the object point included in the cornea image $CI_L$ of the left eye and the position of the image $OP_{IR}$ of the object point included in the cornea image $CI_R$ of the right eye in the captured image, as illustrated in FIGS. 3A and 3B.

Specifically, the controller 22 extracts the image $OP_{IL}$ of the object point in the cornea image $CI_L$ of the left eye in the captured image. In the example illustrated in FIGS. 3A and 3B, the image $OP_{IL}$ of the object point in the cornea image $CI_L$ of the left eye is an image of the object point in the captured image generated by capturing, by the imaging device 1, the image $OP_{EL}$ of the object point in the cornea of the left eye on which the light from the object point OP that constitutes one corner of the rectangular parallelepiped object illustrated in FIG. 1 is projected. The controller 22 extracts the image $OP_{IL}$ of the object point from the entire cornea image $CI_L$ of the left eye by an arbitrary method such as pattern matching and extraction of feature points by edge detection. The controller 22 also extracts the image $OP_{IR}$ of the object point from the entire cornea image $CI_R$ of the right eye.

Based on the captured image, the controller 22 calculates a position $P_1$ (left image formation position) of the image $OP_{EL}$ of the object point in the cornea image $CI_L$ of the left eye on the imaging plane 121 and a position $P_2$ (right image formation position) of the image $OP_{IR}$ of the object point in the cornea image $CI_R$ of the right eye in the real space. Each of $P_1$ and $P_2$ is a vector representing the distance and direction from the origin in the above-mentioned real space.

When calculating the left image formation position $P_1$, the controller 22 calculates a projection position (left projection position) $S_P^L$ of the image $OP_{EL}$ of the object point projected in the cornea of the left eye in the real space. Specifically, it is assumed that the coordinates of the center position in the captured image are (Ox, Oy), the coordinates of the left image formation position $P_1$ are (u, v), and the coordinates of the left projection position $S_P^L$ are (x, y, z) with the pupil of the imaging device in the real space as the origin. In the controller 22, it is assumed that z is the distance $d_L$ from the pupil of the imaging device to the left cornea center position $C^L$ calculated as described above. Since the distance from the left projection position $S_P^L$ to the left cornea center position $C^L$ is very small compared to the distance between the imaging plane 121 and the left cornea center position $C^L$, the distance z can be approximated as the distance from the imaging plane 121 to the left cornea center position $C^L$.

The controller 22 calculates x and y by Expressions (3) and (4), respectively.

$$x=(z/f) \times (u-Ox) \qquad (3)$$

$$y=(z/f) \times (v-Oy) \qquad (4)$$

Figure 8:
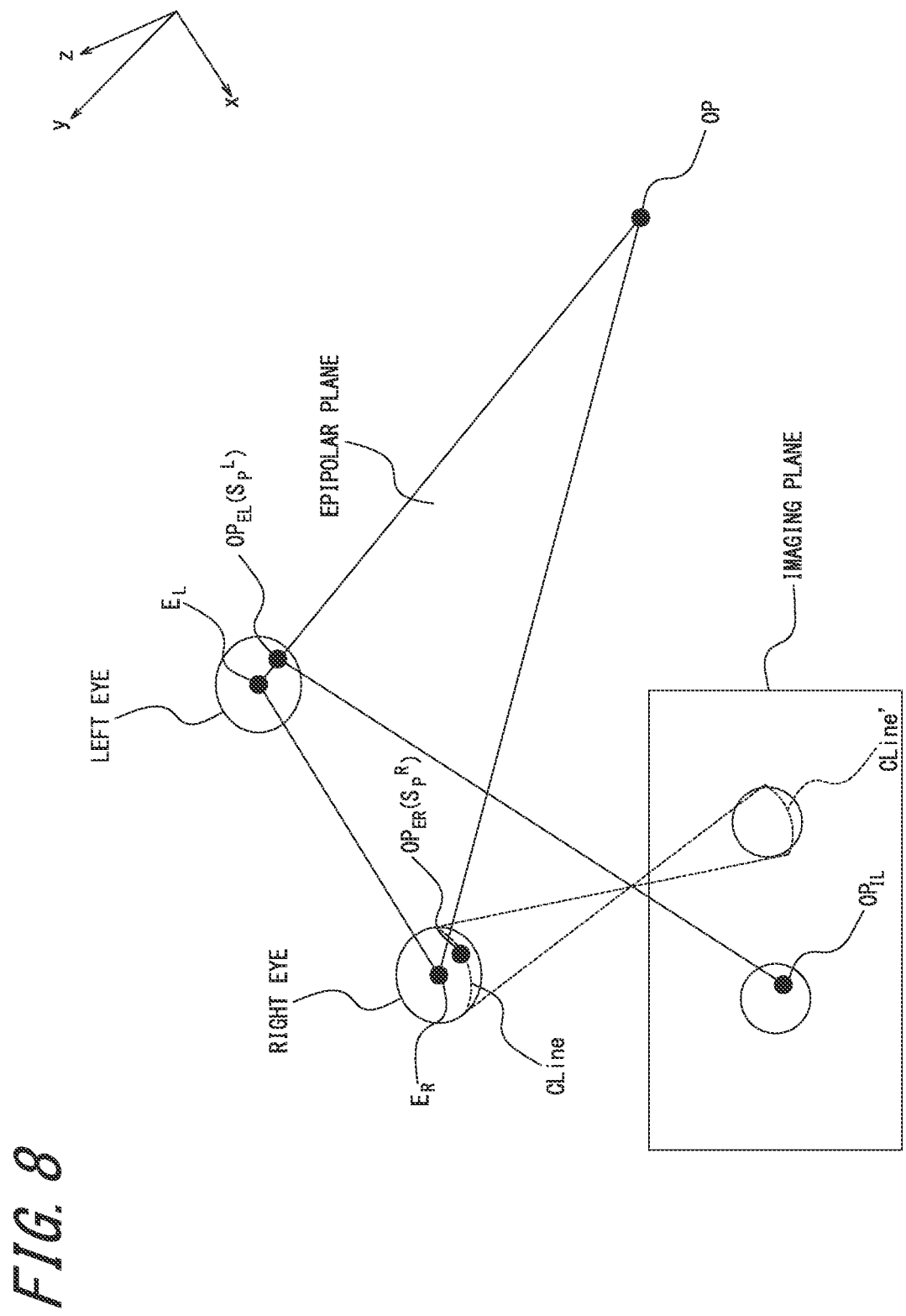
FIG. 8 is a diagram illustrating an image of an object point in the cornea of the right eye calculated by using an epipolar plane.

The controller 22 calculates the projection position (right projection position) $S_P^R$ of an image $OP_{ER}$ of the object point projected in the cornea of the right eye in the real space. Specifically, as illustrated in FIG. 8, the controller 22 calculates an epipolar plane, which is the plane passing through the left projection position $S_P^L$, the left cornea center position $C^L$, and the right cornea center position $C^R$ in the cornea of the left eye. The controller 22 calculates the right projection position $S_P^R$ in the real space, based on the epipolar plane. More specifically, the controller 22 calculates an intersection line CLine between the cornea of the right eye and the epipolar plane. The controller 22 extracts the image $OP_{IR}$ of the object point by searching on a line CLine' corresponding to the intersection line CLine in the cornea image $CI_R$ of the right eye of the captured image. The controller 22 calculates the right projection position $S_P^R$, based on the position of the image $OP_{IR}$ of the object point in the captured image.

Figure 9:
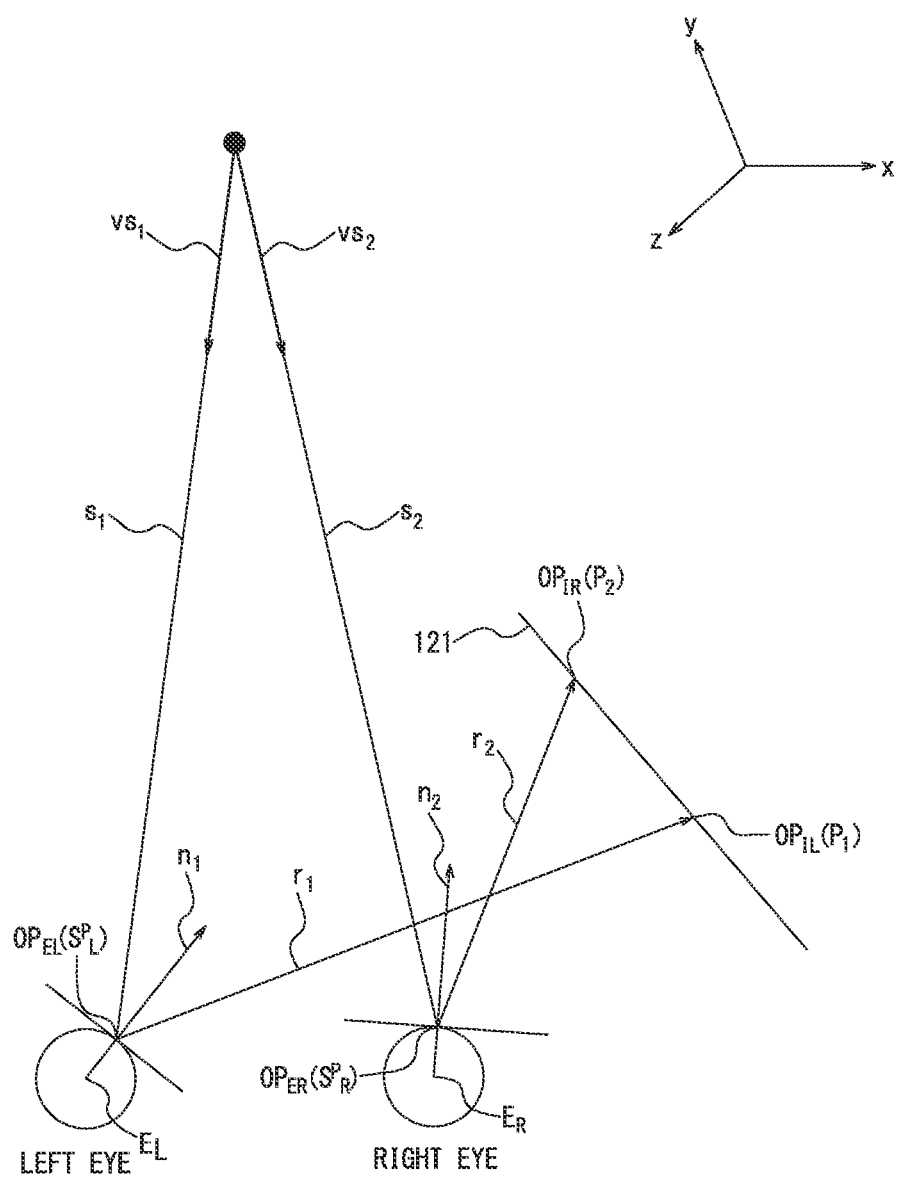
FIG. 9 is a diagram illustrating a relationship between positions of the left eye and the right eye, a position of an imaging plane, and the position of object point.

The controller 22 determines the position of the object point, based on the left projection position $S_P^L$, the right projection position $S_P^R$, the left image formation position $P_1$, and the right image formation position $P_2$. This method will be described with reference to FIG. 9.

The controller 22 calculates a normal vector $n_1$, which is a unit vector indicating the normal direction at the left projection position $S_P^L$. Specifically, the controller 22 calculates the unit vector in the direction from a left-eye center position $E_L$ toward the left projection position $S_P^L$ as the normal vector $n_1$. The left-eye center position $E_L$ can be calculated based on the already calculated left cornea center position $C^L$ and the cornea direction $a_1$ of the left eye. The controller 22 calculates a vector $r_1$ from the left projection position $S_P^L$ toward the left image formation position $P_1$.

As described above, the object point OP is projected on the cornea of the left eye, and the image $OP_{IL}$ of the image $OP_{EL}$ of the object point projected on the cornea of the left eye is formed on the imaging plane 121 of the imaging device 1. Therefore, the angle between a unit vector $vs_1$ from the object point OP toward the left projection position $S_P^L$ and the normal vector $n_1$ at the left projection position $S_P^L$ is the same as the angle formed by the direction from the left projection position $S_P^L$ toward the image $OP_{IL}$ of the object point on the imaging plane 121 and the normal vector $n_1$. Therefore, the controller 22 can calculate a unit vector $s_1$ in the direction from the object point OP to the left projection position $S_P^L$, based on the normal vector $n_1$ and the vector $r_1$ from the left projection position $S_P^L$ toward the left image formation position $P_1$.

Similarly, the controller 22 calculates a unit vector $vs_2$ from the object point OP toward the right projection position $S_P^R$, based on the right projection position $S_P^R$, the right image formation position $P_2$, and the right cornea center position $C^R$.

The left image formation position $P_1$ is represented by Expression (5). In Expression (5), $s_1$ is a scalar quantity indicating the distance from the object point OP to the left projection position $S_P^L$. Since $P_1$, $vs_1$, and $r_1$ are vectors, the operation represented in Expression (5) is a vector operation.

$$P_1 = s_1 \times vs_1 + r_1 \qquad (5)$$

The right image formation position $P_2$ is represented by Expression (6). $P_2$ is a vector representing the distance and direction from a predetermined origin. In Expression (6), $s_2$ is a scalar quantity indicating the distance from the object point OP to the left projection position $S_P^L$. Since $P_2$, $vs_2$, and $r_2$ are vectors, the operation represented in Expression (6) is a vector operation.

$$P = S_2 \times vs_2 + r_2 \qquad (6)$$

The image $OP_{EL}$ of the object point OP projected into the cornea of the left eye forms an image on the imaging plane 121 by orthogonal projection. Therefore, the relationships represented by Expressions (7) and (8) are established between $P_1$, $P_2$, $r_1$, and $r_2$.

$$(P_1 - P_2) \cdot r_1 = 0 \qquad (7)$$

$$(P_1 - P_2) \cdot r_2 = 0 \qquad (8)$$

The controller 22 can calculate the distance $s_1$ and the distance $s_2$ by substituting the $vs_1$, $vs_2$, $r_1$ and $r_2$ calculated as described above into Expressions (5) to (8).

When the distance $s_1$ and the distance $s_2$ are calculated, the controller 22 calculates a position having the distance $s_1$ in the opposite direction of the unit vector $vs_1$ from the left projection position $S_P{}^L$ and the distance $s_2$ in the opposite direction of the unit vector $vs_2$ from the right projection position $S_P{}^R$ as the position of the object point OP. When calculating the position of the object point OP, the controller 22 may calculate the distance from the midpoint of the left eye and the right eye to the object point OP.

Figure 10:
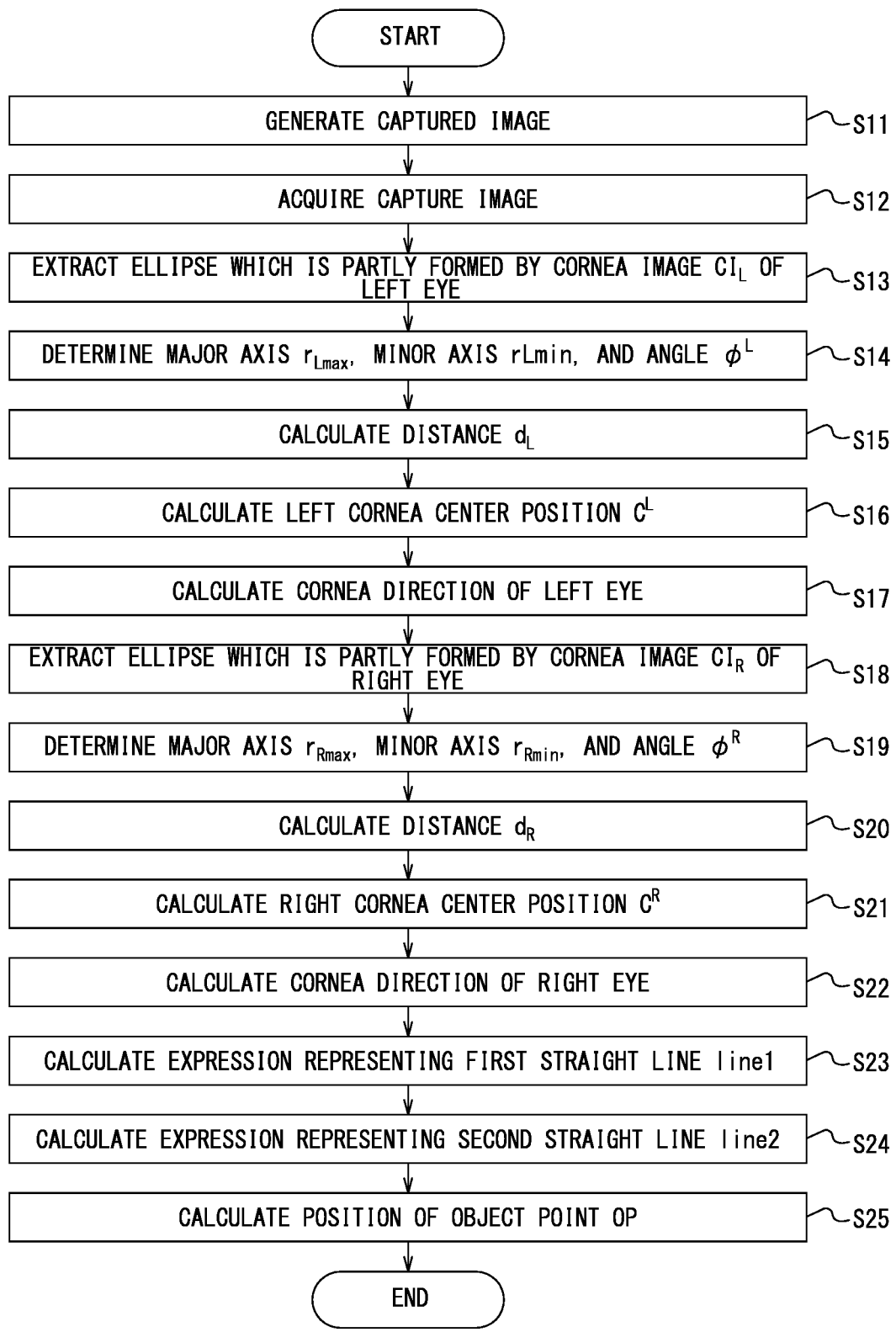
FIG. 10 is a flowchart illustrating processing of determining the position of the object point by using a first example.

The processing executed by the controller 22 using the first example will be described in detail with reference to FIG. 10.

<Processing Using First Example>

The controller 22 causes the imaging device 1 to generate a captured image (step S11).

The controller 22 acquires the captured image generated by the imaging device 1 and received by the second communication module 21 (step S12).

The controller 22 extracts an ellipse which is partly formed by the cornea image $CI_L$ of the left eye, from the captured image (step S13).

The controller 22 determines the major axis $r_{Lmax}$ and minor axis $r_{Lmin}$ of the ellipse, which are extracted in step S13 and the angle $\phi^L$, which is the angle formed by the direction of the major axis $r_{Lmax}$ and the inter-eye direction of the image (step S14).

The controller 22 calculates the distance $d_L$ from the pupil of the imaging device 1 to the left cornea center position $C^L$, based on the focal length f of the imaging device 1, the major axis $r_{Lmax}$ of the ellipse formed by a part of the cornea image $CI_L$ of the left eye, and the cornea radius $r_L$ of the left eye (step S15).

The controller 22 calculates the left cornea center position $C^L$ in the real space, based on the position of the imaging device 1 in the real space, the focal length f, and the distance $d_L$ (step S16).

The controller 22 calculates the angle $\tau^L$ of the cornea direction $a_1$ of a left eye with respect to the left-eye reference direction $a_0$, based on the major axis $r_{Lmax}$ and minor axis $r_{Lmin}$ of the ellipse and determines the direction determined by the angle $\phi^L$ and the angle $\tau^L$ as a cornea direction of the left eye (step S17).

The controller 22 extracts an ellipse which is partly formed by the cornea image $CI_R$ of the right eye from the captured image (step S18).

The controller 22 determines the major axis $r_{Rmax}$ and minor axis $r_{Rmin}$ of the ellipse, which are extracted in step S17, and the angle $\phi R$, which is the angle formed by the direction of the major axis $r_{Rmax}$ and the inter-eye direction of the image (step S19).

The controller 22 calculates the distance $d_R$ from the pupil of the imaging device 1 to the right cornea center position $C^R$, based on the focal length f, the major axis $r_{Rmax}$ of the ellipse which is partly formed by the cornea image $CI_L$ of the left eye, and a cornea radius $r_R$ of the left eye (step S20).

The controller 22 calculates the right cornea center position $C^R$, based on the position of the imaging device 1 in the real space, the focal length f, and the distance $d_R$ (step S21).

The controller 22 calculates an angle $\tau R$ of a cornea direction $b_1$ of the right eye with respect to a right-eye reference direction $b_0$, based on the major axis $r_{Rmax}$ and minor axis $r_{Rmin}$ of the ellipse and determines the direction determined by the angle $\phi^R$ and the angle $\tau^R$ as a cornea direction of the right eye (step S22).

The controller 22 calculates an expression representing the first straight line line1 from the left cornea center position $C^L$ toward the cornea angle $(\tau^L, \phi^L)$ of the left eye (step S23).

The controller 22 calculates an expression representing the second straight line line2 from the right cornea center position $C^R$ toward the cornea angle $(\tau^R, \phi^R)$ of the right eye (step S24).

The controller 22 calculates the intersection of the first straight line line1 and the second straight line line2 as the position of the object point OP (step S25).

<Processing Using Second Example>

Figure 11:
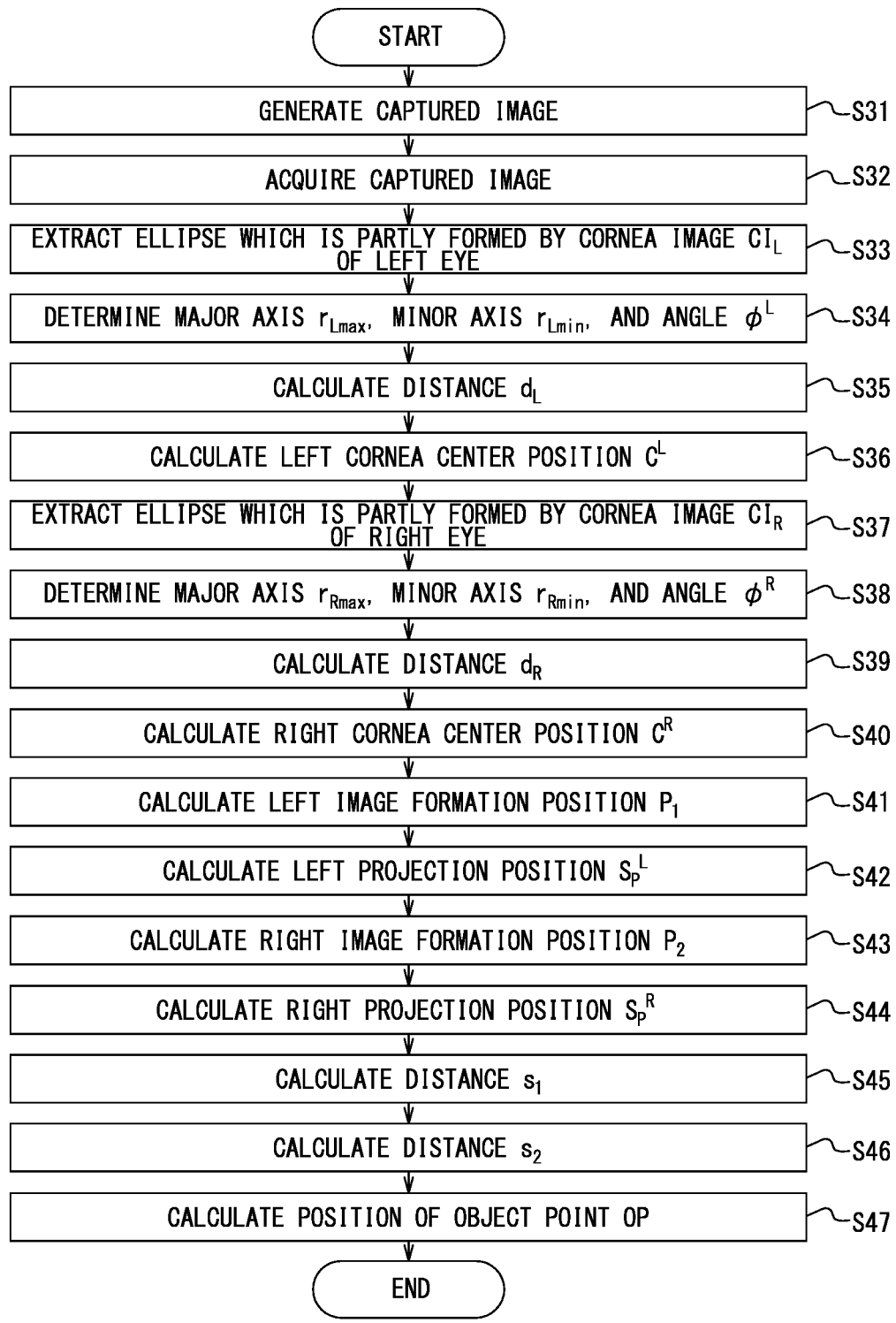
FIG. 11 is a flowchart illustrating processing of determining the position of the object point by using a second example.

The processing executed by the controller 22 using a second example will be described in detail with reference to FIG. 11.

Steps S31 to S36 executed by the controller 22 are the same as steps S11 to S16 in the processing using the first example. Steps S37 to S40 executed by the controller 22 are the same as steps S18 to S21 in the processing using the first example.

The controller 22 extracts the image $OP_{IL}$ of the object point in the cornea image $CI_L$ of the left eye in the captured image and calculates the left image formation position $P_1$ on the imaging plane 121 corresponding to the image $OP_{IL}$ of the object point (step S41).

The controller 22 calculates the left projection position $S_P{}^L$, based on the left image formation position $P_1$, the focal length f, and the left cornea center position $C^L$ (step S42).

The controller 22 extracts the image $OP_{IR}$ of the object point in the cornea image $CI_R$ of the right eye and calculates the right image formation position $P_2$ on the imaging plane 121 corresponding to the image $OP_{IL}$ of the object point (step S43). Here, the controller 22 may calculate the epipolar plane which is a plane passing through the left projection position $S_P{}^L$ in the cornea of the left eye and the left cornea center position $C^L$ and the right cornea center position $C^R$. In such a configuration, the controller 22 can extract the image $OP_{IR}$ of the object point from the line CLine' in the cornea image $CI_R$ of the right eye, which corresponds to the intersection line CLine of the epipolar plane and the cornea of the right eye.

The controller 22 calculates the right projection position $S_P{}^R$, based on the right image formation position $P_2$ by using the imaging plane 121 and the focal length f of the imaging device 1, and the right cornea center position $C^R$ (step S44).

The controller 22 calculates the distance $s_1$ from the left projection position $S_P{}^L$ to the object point OP, based on the left projection position $S_P{}^L$, the normal vector $n_1$ of the tangent plane of the cornea of the left eye at the left projection position $S_P{}^L$, and the left image formation position $P_1$ (step S45).

The controller 22 calculates the distance $s_2$ from the right projection position $S_P{}^R$ to the object point OP, based on the right projection position $S_P{}^R$, the normal vector $n_2$ of the tangent plane of the cornea of the right eye at the right projection position $S_P{}^R$, and the right image formation position $P_2$ (step S46).

The controller 22 calculates the position having the distance $s_1$ from the left projection position $S_P{}^L$ in the direction opposite to the normal vector $n_1$ and the distance $s_2$ from the right projection position $S_P{}^R$ in the direction opposite to the normal vector $n_2$ as the position of the object point OP (step S47).

As the controller 22 according to the first embodiment, an information processing device such as a computer can be adopted. Such an information processing device can be realized by recording a program describing processing contents that realize each function of the controller 22 according to the first embodiment on a non-temporary computer-readable recording medium, and reading and executing the program by a processor. The non-temporary computer-readable recording medium includes, but is not limited to, magnetic storage media, optical storage media, photomagnetic storage media, and semiconductor storage media. Magnetic storage media include magnetic disks, hard disks, and magnetic tapes. Optical storage media include optical discs such as CD (Compact Disc), DVD, and Blu-ray (registered trademark) Disc. Semiconductor storage media include ROM (Read Only Memory), EEPROM (Electrically Erasable Programmable Read-Only Memory), and flash memory.

As described above, in the first embodiment, the controller 22 determines the position of an object point in the real space, based on the cornea image $CI_L$ of the left eye and the cornea image $CI_R$ of the right eye in the captured image. Therefore, the controller 22 can determine the position of the object point without using the captured images generated by the plurality of imaging devices. Therefore, the cost required to provide a plurality of imaging devices can be reduced. The time and effort required for calibration in order to accurately maintain the relationship between the installation positions of the plurality of imaging devices can be reduced.

In the first embodiment, the controller 22 determines the left projection position $S_P^L$ of the object point projected on the left eye, based on the position of the image of the object point in the cornea image $CI_L$ of the left eye. The controller 22 detects the image of the object point in the cornea image $CI_R$ of the right eye, based on the intersection line CLine of the cornea of the right eye with the epipolar plane including the left cornea center position $C^L$, the right cornea center position $C^R$, and the left projection position $S_P^L$. Therefore, the controller 22 can detect the object point from the line CLine', based on the intersection line CLine, not from the entire cornea image $CI_R$ of the right eye of the captured image. Therefore, the load for the controller 22 to detect the image of the object point in the cornea image $CI_R$ of the right eye can be reduced.

Figure 12:
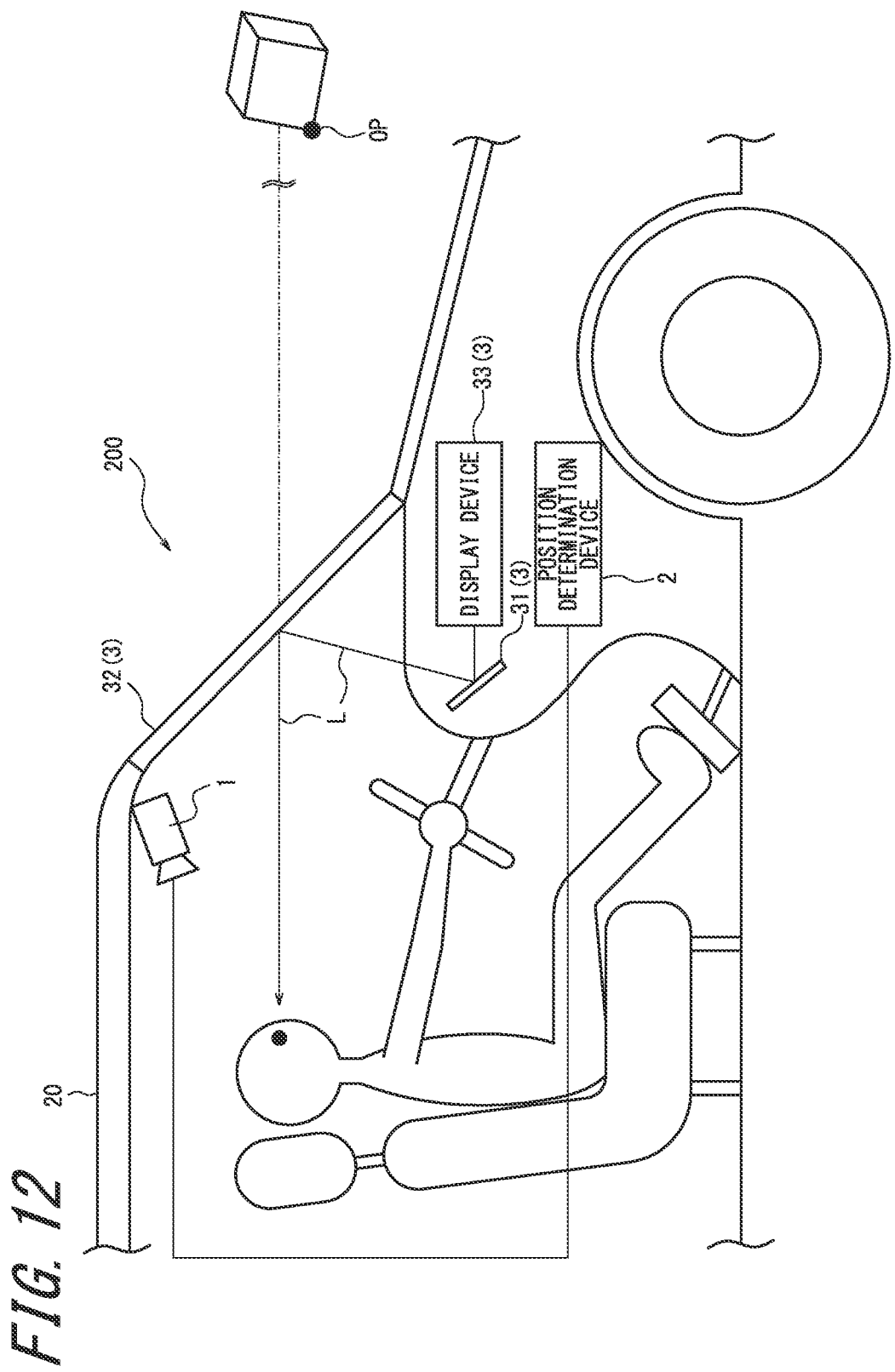
FIG. 12 is a diagram illustrating a schematic configuration of a display system according to a second embodiment.

A display system 200 according to the second embodiment of the disclosure can be mounted on a moving object 20 as illustrated in FIG. 12.

"Moving objects" in the disclosure include vehicles, ships, and aircraft. "Vehicles" in the disclosure include, but are not limited to, automobiles and industrial vehicles and may include railway vehicles, living vehicles, and fixed-wing aircraft traveling on runways. Automobiles include, but are not limited to, passenger cars, trucks, buses, motorcycles, trolley buses, and the like and may include other vehicles traveling on the road. The industrial vehicles include industrial vehicles for agriculture and construction. The industrial vehicles include, but are not limited to, forklifts and golf carts. The industrial vehicles for agriculture include, but are not limited to, tractors, tillers, transplanters, binders, combines, and lawnmowers. The industrial vehicles for construction include, but are not limited to, bulldozers, scrapers, excavators, crane trucks, dump trucks, and road rollers. The vehicles include those that run manually. The classification of vehicles is not limited to those described above. For example, an automobile may include an industrial vehicle capable of traveling on a road and the same vehicle may be included in a plurality of classifications. The ships in the disclosure include marine jets, boats, and tankers. The aircrafts in the disclosure include fixed-wing aircraft and rotary-wing aircraft.

The display system 200 includes the imaging device 1, the position determination device 2, and an HUD 3. The imaging device 1 is the same as the imaging device 1 of the first embodiment. The position determination device 2 is different from that of the first embodiment in that the position determination device 2 communicates with the HUD 3, but is the same in other respects. The position determination device 2 transmits the position of the object point OP in the real space to the HUD 3. The position of the object point OP is the position of a feature point included in what the user is visually observing at each time point, for example, a road sign, a forward vehicle, a pedestrian, an obstacle on the road, and the like. The object point OP is positioned near the cornea direction of the left and right eyes.

The HUD 3 projects an image as a virtual image on the eyes of the user. It is assumed that the HUD 3 is able to adjust the apparent distance to the virtual image that the user views. The HUD 3 can display a virtual image so that the eyes of the user view the virtual image at a position related to the position of the object point OP determined by the position determination device 2. The position related to the position of the object point OP includes a position close to the distance to the object point OP as seen from the user. The HUD 3 may include one or more reflectors 31, an optical member 32, and a display device 33.

The reflector 31 reflects image light emitted from the display device 33 toward a predetermined area of the optical member 32. The predetermined area is an area in which the image light reflected in the predetermined area is directed toward the eyes of the user. The predetermined area can be determined by the direction of the eyes of the user with respect to the optical member 32 and the direction of incident image light on the optical member 32.

The reflector 31 may be one or more mirrors. When the reflector 31 is a mirror, for example, the mirror may be a concave mirror. In FIG. 1, the reflector 31 is displayed as one mirror. However, the reflector 31 is not limited thereto and may be configured by combining two or more mirrors.

The optical member 32 reflects image light emitted from the display device 33 and reflected by one or more reflectors 31 toward the left eye (first eye) and the right eye (second eye) of the user. For example, the windshield of the moving object 20 may also be used as the optical member 32. Therefore, the HUD 3 advances the image light emitted from the display device 33 along an optical path L to the left eye and the right eye of the user. The user can view the image displayed on the display device 33 as a virtual image by the image light arriving along the optical path L.

The display device 33 includes a display element such as a liquid crystal panel. As the display device 33, a display device configured to give parallax to the left and right eyes can be used.

The display device 33 displays an image so that the eyes of the user view a virtual image of the image displayed by the display device 33 at a position related to the position of the object point OP determined by the position determination device 2. The position related to the object point OP is a position close to the object point OP to the extent that the user is less likely to feel the load of changing the focal length of the eye when changing from the state of viewing the object point OP to the state of viewing the virtual image. The position related to the object point OP may be, for example, a position overlapping the object point OP in a field of view of the user. The position related to the object point OP may be a position within a predetermined range from the object point OP.

In order to adjust the display position of the virtual image including the distance to the virtual image, in the HUD 3, the relative positions of the reflector 31 and the display elements of the display device 33 may be adjustable according to the position of the object point OP determined by the position determination device 2. In the case of a display device such as the display device 33 that is configured to give parallax to the left and right eyes, the display device 33 may be configured to adjust the parallax amount according to the position of the object point OP determined by the position determination device 2.

The image displayed by the display device 33 may display information related to or not related to the object point OP. When the image displayed by the display device 33 is an image illustrating information about the object point OP, for example, the image may be an image for warning the user that the object point OP exists. For example, the image may be an image illustrating the distance from the moving object 20 to the object point OP. In the configuration in which the image is an image for illustrating the distance from the moving object 20 to the object point OP, for example, the position determination device 2 can calculate the distance from the moving object 20 to the object point OP, based on the relationship between the position of the eyes of the user and the position of the front-end portion of the moving object 20. Then, the display device 33 may receive the distance from the moving object 20 to the object point OP, which is calculated by the position determination device 2 and display an image illustrating the distance.

As the controller 22 according to the second embodiment, an information processing device such as a computer can be adopted. Such an information processing device can be realized by recording a program describing processing contents that realize each function of the controller 22 according to the second embodiment on a computer-readable recording medium, and reading and executing the program by a processor.

According to the second embodiment, the cost required to provide a plurality of imaging devices can be reduced as in the first embodiment. The time and effort required for calibration in order to accurately maintain the relationship between the installation positions of the plurality of imaging devices can be reduced.

According to the second embodiment, the display system 200 displays a virtual image so that the user views the virtual image at the position related to the object point OP. Therefore, the display system 200 can make the user less likely to feel the load of changing the focal length of the eye when the user changes from the state of viewing the object point OP to the state of viewing the virtual image. Therefore, eye fatigue of the user can be reduced.

Although the above embodiments have been described as representative examples, it will be apparent to those skilled in the art that many modifications and substitutions can be made within the spirit and scope of the present invention. Therefore, the invention should not be construed as limiting by the embodiments described above, and various modifications and changes can be made without departing from the claims. For example, it is possible to combine the plurality of constituent blocks described in the embodiments and the examples into one, or to divide one constituent block.

In the second example of the above-described embodiment, the controller 22 extracts the position of the object point in the cornea image $CI_L$ of the left eye, and then calculates the plane including three points of the position of the image $OP_{EL}$ of the object point in the cornea of the left eye, the left cornea center position $C^L$, and the right cornea center position $C^R$ as an epipolar plane. However, the method of calculating the epipolar plane is not limited thereto. For example, after extracting the position of the image $OP_{IL}$ of the object point in the cornea image $CI_R$ of the right eye, the controller 22 may calculate a plane including three points of the position of the image $OP_{ER}$ of the object point in the cornea of the right eye, the left cornea center position $C^L$, and the right cornea center position $C^R$ as the epipolar plane.

In the second example of the above-described embodiment, the controller 22 does not have to calculate the epipolar plane. In such a configuration, the controller 22 may extract the images OPLL and $OP_{ER}$ of the object point from the entire cornea image of the left and right eyes, respectively.

In the above-described embodiment, the controller 22 carries out steps S13 to S17 and then steps S18 to S22, but the procedure executed by the controller 22 is not limited thereto. For example, the controller 22 may carry out steps S13 to S17 after carrying out steps S18 to S22. The controller 22 may carry out steps S13 to S17 and steps S18 to S22 in parallel.

In the above-described embodiment, the controller 22 carries out step S24 after carrying out step S23, but the procedure executed by the controller 22 is not limited thereto. For example, the controller 22 may carry out step S23 after carrying out step S24. The controller 22 may carry out steps S23 and S24 in parallel.

In the above-described embodiment, the controller 22 carries out steps S33 to S36 and then steps S37 to S40, but the procedure executed by the controller 22 is not limited thereto. For example, the controller 22 may carry out steps S33 to S36 after carrying out steps S37 to S40. The controller 22 may carry out steps S33 to S36 and steps SS37 to S40 in parallel.

In the above-described embodiment, the controller 22 carries out steps S43 and S44 after carrying out steps S41 and S42, but the procedure carried out by the controller 22 is not limited thereto. For example, the controller 22 may carry out steps S41 and S42 after carrying out steps S43 and S44. The controller 22 may carry out steps S41 and S42 and steps S43 and S44 in parallel.

In the above-described embodiment, the controller 22 carries out step S46 after carrying out step S45, but the procedure executed by the controller 22 is not limited thereto. For example, the controller 22 may carry out step S45 after carrying out step S46. The controller 22 may carry out steps S45 and S46 in parallel.

REFERENCE SIGNS LIST

1: Imaging device
2: Position determination device
3: HUD
11: Imaging optical system
12: Imaging element
13: First communication module
20: Moving object
21: Second communication module
22: Controller
31: Reflector
32: Optical member
33: Display device
100: Position determination system
121: Imaging plane
200: Display system
d: Parallax OP: Object point
$OP_{IL}$: Image of object point in cornea image of left eye
$OP_{IR}$: Image of object point in cornea image of right eye
$OP_{EL}$: Image of object point in cornea of left eye
$OP_{ER}$: Image of object point in corner of right eye
$P_1$: Position of image of object point in cornea image of left eye
$P_2$: Position of image of object point in cornea image of right eye
$s_1$: Length from object point OP to projection position $S_P^L$
$s_2$: Length from object point OP to projection position $S_P^R$
$S_P^L$: Left projection position
$S_P^R$: Right projection position
$vs_1$: Unit vector from object point OP toward projection position $S_P^L$
$vs_2$: Unit vector from object point OP toward projection position $S_P^R$

The invention claimed is:

1. A controller that is configured
to determine a position of an object point in a real space, based on a cornea image of a first eye and a cornea image of a second eye of a user who is viewing the object point, in a captured image generated by imaging the first and second eyes of the user by an imaging device,
to determine, based on the cornea image of the first eye, a first cornea center position which is a center of a boundary between a cornea and a sclera of the first eye in the real space and determine, based on the cornea image of the second eye, a second cornea center position which is a center of a boundary between a cornea and a sclera of the second eye in the real space,
to determine a position of the object point based on the first cornea center position and the second cornea center position,
to determine the position of the object point, based on a position of an imaging plane of the imaging device, positions of images of the object point in the cornea images of the first eye and the second eye in the captured image, and a focal length of the imaging device in the real space,
to determine projection positions of the object point projected in the corneas of the first eye and the second eye, based on the positions of the images of the object point in the cornea images of the first eye and the second eye,
to determine the position of the object point, based on the position of the imaging plane, the focal length, and the projection positions,
to determine the projection position of the object point projected in the first eye, based on the position of the image of the object point in the cornea image of the first eye in the captured image, and
to extract the image of the object point from the cornea image of the second eye in the captured image, based on an intersection line of an epipolar plane comprising the first cornea center position, the second cornea center position, and the projection position of the first eye, and the cornea of the second eye.

2. The controller according to claim 1, wherein the controller is configured to determine a first cornea center position, based on major and minor axes of an ellipse which is formed by a part of the cornea image of the first eye.

3. A position determination device, comprising:
a communication module that is configured to receive a captured image generated by imaging first and second eyes of a user who is viewing an object point, by an imaging device; and
a controller that is configured
to determine a position of the object point in a real space, based on a cornea image of the first eye and a cornea image of the second eye in the captured image,
to determine, based on the cornea image of the first eye, a first cornea center position which is a center of a boundary between a cornea and a sclera of the first eye in the real space and determine, based on the cornea image of the second eye, a second cornea center position which is a center of a boundary between a cornea and a sclera of the second eye in the real space,
to determine a position of the object point based on the first cornea center position and the second cornea center position,
to determine the position of the object point, based on a position of an imaging plane of the imaging device, positions of images of the object point in the cornea images of the first eye and the second eye in the captured image, and a focal length of the imaging device in the real space,
to determine projection positions of the object point projected in the corneas of the first eye and the second eye, based on the positions of the images of the object point in the cornea images of the first eye and the second eye,
to determine the position of the object point, based on the position of the imaging plane, the focal length, and the projection positions,
to determine the projection position of the object point projected in the first eye, based on the position of the image of the object point in the cornea image of the first eye in the captured image, and
to extract the image of the object point from the cornea image of the second eye in the captured image, based on an intersection line of an epipolar plane comprising the first cornea center position, the second cornea center position, and the projection position of the first eye, and the cornea of the second eye.

4. A position determination system, comprising:
an imaging device; and
a position determination device comprising
a communication module that is configured to receive a captured image generated by imaging first and second eyes of a user who is viewing an object point, by the imaging device, and
a controller that is configured
to determine a position of the object point in a real space, based on a cornea image of the first eye and a cornea image of the second eye in the captured image,
to determine, based on the cornea image of the first eye, a first cornea center position which is a center of a boundary between a cornea and a sclera of the first eye in the real space and determine, based on the cornea image of the second eye, a second cornea center position which is a center of a boundary between a cornea and a sclera of the second eye in the real space,
to determine a position of the object point based on the first cornea center position and the second cornea center position, to determine the position of the object point, based on a position of an imaging plane of the imaging device, positions of images of the object point in the cornea images of the first eye and the second eye in the captured image, and a focal length of the imaging device in the real space, to determine projection positions of the object point projected in the corneas of the first eye and the second eye, based on the positions of the images of the object point in the cornea images of the first eye and the second eye, to determine the position of the object point, based on the position of the imaging plane, the focal length, and the projection positions, to determine the projection position of the object point projected in the first eye, based on the position of the image of the object point in the cornea image of the first eye in the captured image, and to extract the image of the object point from the cornea image of the second eye in the captured image, based on an intersection line of an epipolar plane comprising the first cornea center position, the second cornea center position, and the projection position of the first eye, and the cornea of the second eye.

5. A display system, comprising:

an imaging device;

a position determination device comprising
- a communication module that is configured to receive a captured image generated by imaging first and second eyes of a user who is viewing an object point, by an imaging device, and
- a controller that is configured to determine a position of the object point in a real space, based on a cornea image of the first eye and a cornea image of the second eye in the captured image; and a head-up display that is configured to display, based on the position of the object point determined by the controller, a virtual image that the eyes of the user view at a position related to the position of the object point, the controller being configured to determine, based on the cornea image of the first eye, a first cornea center position which is a center of a boundary between a cornea and a sclera of the first eye in the real space and determine, based on the cornea image of the second eye, a second cornea center position which is a center of a boundary between a cornea and a sclera of the second eye in the real space, to determine a position of the object point based on the first cornea center position and the second cornea center position, to determine the position of the object point, based on a position of an imaging plane of the imaging device, positions of images of the object point in the cornea images of the first eye and the second eye in the captured image, and a focal length of the imaging device in the real space, to determine projection positions of the object point projected in the corneas of the first eye and the second eye, based on the positions of the images of the object point in the cornea images of the first eye and the second eye, to determine the position of the object point, based on the position of the imaging plane, the focal length, and the projection positions, to determine the projection position of the object point projected in the first eye, based on the position of the image of the object point in the cornea image of the first eye in the captured image, and to extract the image of the object point from the cornea image of the second eye in the captured image, based on an intersection line of an epipolar plane comprising the first cornea center position, the second cornea center position, and the projection position of the first eye, and the cornea of the second eye.

6. A non-transitory computer-readable recording medium recording a program for causing a controller:

to determine a position of an object point in a real space, based on a cornea image of a first eye and a cornea image of a second eye of a user who is viewing the object point, in a captured image generated by imaging the first and second eyes of the user by an imaging device, to determine, based on the cornea image of the first eye, a first cornea center position which is a center of a boundary between a cornea and a sclera of the first eye in the real space and determine, based on the cornea image of the second eye, a second cornea center position which is a center of a boundary between a cornea and a sclera of the second eye in the real space, to determine a position of the object point based on the first cornea center position and the second cornea center position, to determine the position of the object point, based on a position of an imaging plane of the imaging device, positions of images of the object point in the cornea images of the first eye and the second eye in the captured image, and a focal length of the imaging device in the real space, to determine projection positions of the object point projected in the corneas of the first eye and the second eye, based on the positions of the images of the object point in the cornea images of the first eye and the second eye, to determine the position of the object point, based on the position of the imaging plane, the focal length, and the projection positions, to determine the projection position of the object point projected in the first eye, based on the position of the image of the object point in the cornea image of the first eye in the captured image, and to extract the image of the object point from the cornea image of the second eye in the captured image, based on an intersection line of an epipolar plane comprising the first cornea center position, the second cornea center position, and the projection position of the first eye, and the cornea of the second eye.

* * * * *